United States Patent
Friedrich et al.

(10) Patent No.: US 9,888,047 B2
(45) Date of Patent: Feb. 6, 2018

(54) EFFICIENT ON-DEMAND GENERATION OF ABR MANIFESTS

(71) Applicant: Cisco Technology Inc., San Jose, CA (US)

(72) Inventors: Eric Friedrich, Sommerville, MA (US); Matt Caulfield, Clinton, MA (US); Carol Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 14/244,174

(22) Filed: Apr. 3, 2014

(65) Prior Publication Data
US 2015/0288730 A1    Oct. 8, 2015

(51) Int. Cl.
*H04L 29/06* (2006.01)

(52) U.S. Cl.
CPC ........ *H04L 65/4084* (2013.01); *H04L 65/607* (2013.01); *H04L 65/608* (2013.01)

(58) Field of Classification Search
CPC . H04L 65/4084; H04L 65/608; H04L 65/607; H04L 65/60; H04N 21/8456; H04N 21/26258; H04N 21/23424
See application file for complete search history.

(56) References Cited

U.S. PATENT DOCUMENTS

| | | | |
|---|---|---|---|
| 7,580,416 B2 | 8/2009 | Darshan et al. | |
| 7,756,201 B2 | 7/2010 | Darshan et al. | |
| 8,701,145 B1 * | 4/2014 | Berger | H04N 21/4147 725/32 |
| 9,106,934 B2 * | 8/2015 | Horen | H04N 21/64707 |
| 2006/0188229 A1 * | 8/2006 | Yamagata | G11B 27/105 386/244 |
| 2007/0002946 A1 * | 1/2007 | Bouton | H04N 19/15 375/240.01 |
| 2007/0102764 A1 * | 5/2007 | Ando | G11B 20/00086 257/355 |
| 2007/0226623 A1 * | 9/2007 | Togashi | G11B 19/025 715/716 |
| 2008/0077611 A1 * | 3/2008 | Yamasaki | G11B 27/031 |
| 2009/0006479 A1 * | 1/2009 | Fujita | G06F 17/30053 |
| 2009/0087159 A1 * | 4/2009 | Onoda | G11B 20/1217 386/248 |
| 2010/0011407 A1 * | 1/2010 | Herlein | H04N 7/165 725/146 |
| 2010/0305726 A1 * | 12/2010 | Lu | G06F 3/0481 700/94 |

(Continued)

OTHER PUBLICATIONS

"Encoder Boundary Point Specification," *Open Cable Specifications*: OC-SP-EBP-101-130-118 (Cable Television Laboratories Jan. 18, 2013).

(Continued)

*Primary Examiner* — Uzma Alam
(74) *Attorney, Agent, or Firm* — Samuel M. Katz (57) ABSTRACT

In one embodiment of the present invention, an HLS transcoder inserts a plurality of encoder boundary points (EBPs) into an HLS formatted content item, a processor places hints about locations of the inserted EBPs, and an inputter inputs the HLS formatted content item into an on-demand encapsulation process. Related systems, apparatus and methods are also described.

18 Claims, 4 Drawing Sheets

(56) References Cited

U.S. PATENT DOCUMENTS

| | | | |
|---|---|---|---|
| 2011/0271092 A1* | 11/2011 | Brelay | G11B 27/005 713/150 |
| 2012/0109971 A1* | 5/2012 | Jellison, Jr. | G06F 17/30038 707/748 |
| 2012/0284802 A1* | 11/2012 | Hierro | G06F 21/10 726/27 |
| 2012/0303759 A1* | 11/2012 | Adimatyam | H04L 67/306 709/219 |
| 2013/0007794 A1* | 1/2013 | Besehanic | H04L 65/607 725/20 |
| 2014/0032777 A1* | 1/2014 | Yuan | H04L 67/26 709/231 |
| 2014/0064703 A1* | 3/2014 | Takeuchi | H04N 5/783 386/248 |
| 2014/0075042 A1* | 3/2014 | Giladi | H04L 65/605 709/231 |
| 2014/0082206 A1* | 3/2014 | Samuell | H04L 65/1069 709/227 |
| 2014/0095341 A1* | 4/2014 | Woods | G06Q 30/06 705/26.5 |
| 2014/0150019 A1* | 5/2014 | Ma | G06Q 30/0251 725/34 |
| 2014/0161050 A1* | 6/2014 | Grinshpun | H04L 65/4069 370/329 |
| 2014/0165120 A1* | 6/2014 | Losev | H04N 21/47202 725/97 |
| 2014/0180818 A1* | 6/2014 | Mistler | G06Q 30/0259 705/14.57 |
| 2014/0215085 A1* | 7/2014 | Li | H04L 65/4084 709/231 |
| 2014/0215541 A1* | 7/2014 | Horen | H04N 21/2181 725/109 |
| 2014/0282766 A1* | 9/2014 | Good | H04L 65/607 725/93 |
| 2014/0282771 A1* | 9/2014 | Tumuluru | H04N 21/2662 725/95 |
| 2014/0344575 A1* | 11/2014 | Saremi | H04L 63/0428 713/168 |
| 2015/0019694 A1* | 1/2015 | Feng | H04L 65/601 709/219 |
| 2015/0134846 A1* | 5/2015 | Bazar | H04L 65/608 709/231 |
| 2015/0163379 A1* | 6/2015 | Herzog | H04N 21/8547 348/500 |
| 2015/0271234 A1* | 9/2015 | O'Malley | H04L 65/602 709/219 |

OTHER PUBLICATIONS

VideoLan; Problems Streaming and Receiving TS Streams With Subtitles (2010) Can be seen at: https://trac.videolan.org/vlc/ticket/3461 and https://trac.videolan.org/vlc/timeline?from=2010-03-25T23%3A01%3A02%2B01%3A00&precision=second.

The Videolan Forums; Private Data PID (2017) Can be seen at: https://forum.videolan.org/viewtopic.php?t=59000.

* cited by examiner

EFFICIENT ON-DEMAND GENERATION OF ABR MANIFESTS

FIELD OF THE INVENTION

The present invention generally relates to adaptive bitrate streaming.

BACKGROUND OF THE INVENTION

Adaptive Bitrate (ABR) Streaming of media over a network from a content distribution network has been widely adopted for media consumption. Various protocols for such streaming have been proposed, and are often associated with various providers of hardware or software. For example, and without limiting the generality of the foregoing, the HTTP Live Streaming (HLS) protocol has been put forth by Apple, and is typically associated with Apple devices, such as, iPhones, iPads, and so forth. Likewise, the HTTP Smooth Streaming (HSS) protocol has been proposed by Microsoft, and is accordingly often associated with Microsoft products, such as Windows Phone and Silverlight. The HTTP Dynamic Streaming (HDS) protocol is associated with Adobe and Adobe products, such as Flash Player and Flash Media Server. MPEG DASH (Dynamic Adaptive Streaming over HTTP, ISO/IEC 23009-1:2012) was put forward by the MPEG standards body as yet another alternative standard adaptive bitrate protocol.

It is appreciated that each of these protocols may be supported on hardware or by software produced by one of these bodies, even though that particular hardware or software may be produced by one particular provider, and the adaptive bitrate format associated with a different provider. By way of example, a device running a Microsoft operating system may be displaying streamed content which is streamed using the HDS protocol of Adobe.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method and system is described for preparing content for streaming, the method and system including receiving an HLS formatted content item, inserting, by a HLS packager processor, a plurality of encoder boundary points (EBPs) into the HLS formatted content item, placing hints about the location of the inserted EBPs at the start of broadcast metadata of HLS segments in the HLS formatted content item, and inputting the HLS formatted content item into an on-demand encapsulation process. Related methods, systems and apparatus are also described.

Exemplary Embodiment

Figure 1:
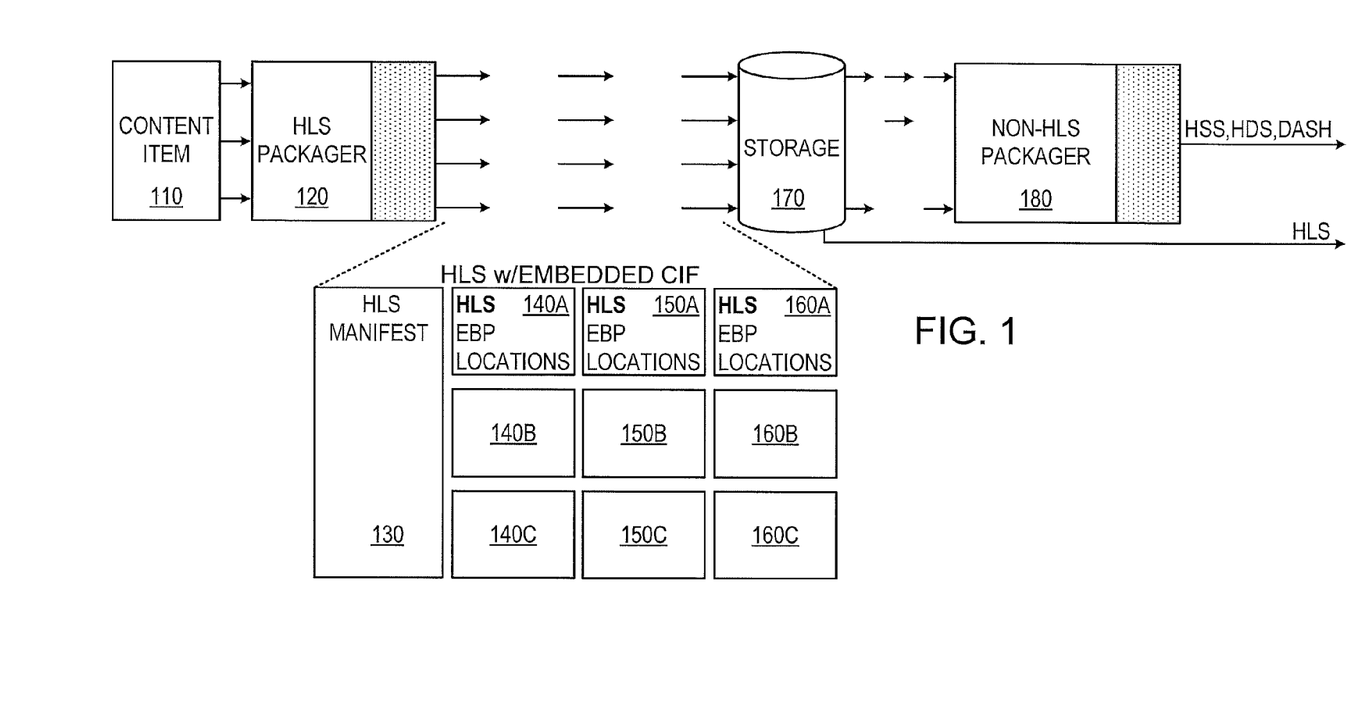
FIG. 1 is a simplified depiction of a system in which a HTTP Live Streaming (HLS) is adapted to one of a number of non-HLS formats.

Reference is now made to FIG. 1, which a simplified depiction of a system in which a HTTP Live Streaming (HLS) is adapted to one of a number of non-HLS formats.

Given the number of popular formats for adaptive bitrate (ABR) clients, such as, and without limiting the generality of the foregoing, HSS (HTTP Smooth Streaming), HLS (HTTP Live Streaming), HDS (HTTP Dynamic Streaming), and MPEG DASH (ISO/IEC 23009-1:201), service providers are usually forced to support multiple formats in order to meet the needs of their customers which wish to consume content via adaptive bit rate streaming. By using a Common Intermediate Format (CIF), service providers are given the flexibility to convert to each end-client format as needed, on the fly. Using a CIF enables significant storage, cache, and bandwidth savings for the service provider, or any other user of ABR.

HLS is a popular ABR format, especially in view of the large number of Apple client devices in the market. If HLS is chosen as a CIF it confers significant advantages over any existing proprietary CIF. Aside from gaining the simplicity and flexibility of HLS, service providers can also avoid vendor lock-in to a proprietary CIF by choosing HLS as a CIF. It is appreciated that although HLS is itself a proprietary protocol, it is also well-known, widely supported, and documented. Additionally, HLS segments are typically Transport Stream based, which is a major industry standard.

The present invention deals with particular issues created by the conversion from HLS to HSS, HDS, and MPEG DASH. Service Providers have a need to support multiple ABR formats and end devices. Apple, Microsoft and Adobe all have competing ABR formats (and associated protocols). Additionally there is an emerging standards-based ABR format from MPEG. These formats differ in both manifests and assets (segments or fragments).

Current delivery mechanisms would require storing four (or more) copies of the content on origin, one in each format. These copies would also occupy at least four times the CDN (content delivery network, see FIG. 2, below) storage and delivery bandwidth.

A Cisco proprietary solution to the problem stated above is known as Common Intermediate Format (CIF). A CIF asset is a superset of all ABR formats and can be transformed into any specific ABR format using a process known as On-Demand Encapsulation (ODE). However, this solution relies on proprietary asset preparation to put an asset into the Common Intermediate Format. Additionally, the ODE process is proprietary. Without ODE the asset can only be used for non-ABR forms of streaming but not for ABR delivery. For instance, without ODE, the asset may be used for QAM (i.e. quadrature amplitude modulation) streaming; IP or UDP streaming (RTP optional), or some other non-ABR form of streaming. This proprietary nature is presenting an obstacle to adoption for some service providers. Such service providers typically are wary to store their ABR content libraries in a vendor-specific format.

As an alternative, service providers would prefer to maintain their VOD library in an existing, well-supported ABR format, for example, and without limiting the generality of the foregoing, Apple's HLS. Content stored in HLS could be delivered without transformation to HLS clients. Modifying ODE to use HLS content instead of CIF would allow on-demand transformation from HLS into Microsoft Smooth, DASH, or Adobe HDS.

The HLS Common Format (HLSCF) would use the existing HLS master and stream playlists and existing HLS Segments (both audio and video multiplexed; video-only; and audio-only). Traditional CIF-based ODE allows for delivering content of multiple segment durations (for example, and without limiting the generality of the foregoing, HLS has 10 second segments and Smooth has 2 second segments). Segment durations in ABR have implications on CDN bandwidth and caching policies, origin server storage requirements, and end-user quality of experience. It is therefore desirable for the service provider to have options in their choice of segment duration.

However, HLS manifests can only express a single timeline using one segment duration, limiting HLSCF assets to only using a single segment duration as well. CDNs and other content providers have expressed a strong preference for flexibility in the segment durations of their content libraries. While they may choose to use 10 second segments today, it is very important to maintain the option later to deliver 2 second segments at a future time. It is therefore desirable to combine the objectives of storage in a popular ABR format (i.e. such as HLS) with the delivery flexibility and power of ODE.

Additionally, for efficient operation, ODE requires easy access to well-known decoder configuration information such as AVC SPS (H.264 Advanced Video Coding Sequence Parameter Set), PPS (H.264 Advanced Video Coding Picture Parameter Set), and AAC ADTS (H.264 Advanced Audio Coding Audio Data Transport Stream). Without efficient access to the decoder configuration, ODE would need to search through the video content. This is a computationally expensive operation to perform, and would retrieve only a few bytes of information. Using ODE to generate an ABR manifest can usually be done entirely by manifest transformation. If the decoder configuration is not included in the manifest, ODE would need to resort to the video content to produce a manifest.

The content items referred to are typically either video content items (which comprise an accompanying audio track), audio content items, and XML/WebVTT text or image based caption or subtitle track. The content items are conventionally broken up into segments, usually either 10 seconds in length if HLS is used, or 2 seconds in length if one of the other protocols are used. It is appreciated that content items may be segmented into segments of other time lengths as well.

Those skilled in the art will appreciate that the terms "segment" and "fragment" are used interchangeably in the ABR realm. Typically, the term "segment" is used in discussing HLS and DASH, while the term "fragment" is used in discussions about HSS and HDS. Accordingly, the two terms "fragment" and "segment", in all of their various forms, are understood in the present specification and claims to be referring to the same thing, unless otherwise explicitly noted.

In FIG. 1, a transport stream (TS) formatted content item 110 is input into an HLS packager 120, which performs the first part of the encoding process by producing the HLS manifest 130. An exemplary HLS manifest 130, in its most basic form (typically found as a *.m3u file), comprises heading information followed by the tags:

```
#EXTINF:10.0,
http://example.com/content_item1/fileSegment1
#EXTINF:10.0,
http://example.com/content_item1/fileSegment2
#EXTINF:10.0,
http://example.com/content_item2/fileSegment1
```

In the above example, each EXTINF is a record marker that describes the media file identified by the URL that follows it. Each media file URL must be preceded by an EXTINF tag. The EXTINF tag contains a "duration" attribute that is an integer or floating-point number in decimal positional notation that specifies the duration of the media segment in seconds. In the above example, the duration of each of the three segments is 10.0 seconds.

In addition to the above mentioned information, the HLS manifest 130 also is produced containing content describing metadata, such as, but not limited to: filenames, resolutions, and bitrates. Additionally, decoder specific configuration such as SPS, PPS, and ADTS is added to the HLS manifest 130.

The content item 110 is typically segmented by the HLS packager 120 into segments 140*a-c*, 150*a-c*, 160*a-c* such that for each segment 140, 150, 160 of the content item different versions (*a-c*) at different bitrates are available.

An ABR transcoder typically transcodes a file of content configured for a single bitrate to multiple files configured for a range of output bitrates. It is appreciated that the two functionalities of creating multiple bitrates and of packaging those multiple bitrates into HLS may be performed by two separate components: the HLS packager 120 and the ABR transcoder. Alternatively, the HLS packager 120 and the ABR transcoder may be combined into one single component possessing the functionalities of both of the HLS packager 120 and the ABR transcoder.

The ABR transcoder may either receive the file of content in its entirety or may receive the file as input streamed content from the network. It is appreciated that network streamed content may be intermittent (e.g. for scheduled events such as a sporting event) or may be continuous (such as a 24×7 broadcast channel). The ABR transcoder also embeds segment boundary markers (i.e. encoder boundary points (EBPs)) into the content items. The EBPs reflect the conditioning of multiple segment durations in the content and provide further information than the obvious segmentation of content on disk. For example, HLS segments may be segmented at 10 second intervals (denoted by EBPs 10 seconds apart). These segments may also contain EBPs 2 seconds apart that describe how the content could be segmented to alternatively produce 2-second segments. The ABR transcoder also inserts IDR (i.e. MPEG-4/H.264 Instantaneous Decoding Refresh access unit) and audio headers at appropriate points in the content stream.

If the EBP insertion does not occur in the same location as either a) the HLS formatting is composed; or b) the hints are inserted into the HLS content, then an additional step of locating the EBPs needs to be taken.

The HLS manifest only contains information on a single timeline, so in order to prepare any additional timelines embedded in the content, an additional packager process would need to examine the content on disk. As searching for EBP markers is computationally very expensive, hints regarding the EBP locations are inserted within the HLS segments 140*a-c*, 150*a-c*, 160*a-c* themselves.

The mechanism for including hints within HLS Segments varies depending on segment format. For a TS-based HLS Segment, such as segments 140a-c, 150a-c, 160a-c, a private PID can be allocated for hinting. This private PID would contain TS packets very near the beginning of the HLS segment 140a-c, 150a-c, 160a-c. The private data describe the byte offsets of EBPs, their timestamps, and their types (segment, fragment, partition n). Further, the private data contains the byte offset, length (i.e. the size of the I-Frames in bytes in the TS file (including TS overhead)), and timestamp of I-Frames for use in producing trick play manifest. Alternatively, other forms of broadcast metadata may be used as containers for hint information about the EBPs. For instance, an EBP marker located in the Adaptation Field of the TS Header that is typically already present at the beginning of each HLS Segment can be extended to include this data. If EBP is not present, the EBP marker can be added.

Once the HLS packager 120 produces the HLS manifest 130 and the HLS segments 140a-c, 150a-c, 160a-c, they are stored in a storage device 170.

At a later time, if an ABR client device requests HLS formatted content, then the HLS formatted content is already prepared and stored in the storage device 170. It is appreciated that storage device may comprise any appropriate storage device as is known in the art, including, but not limited to mass storage devices (e.g. hard drives), removable storage (e.g. CD or DVD based storage), or virtual storage devices (e.g. cloud or CDN based storage). This stored HLS formatted content is then sent to the requesting device at that time.

However, if the requesting device requests that the ABR content be delivered in a non-HLS format, then a non-HLS packager 180 receives the prepared and stored HLS Common Format manifest 130 and content segments 140a-c, 150a-c, 160a-c.

The non-HLS packager 180 need not search an entire segment for EBPs, it need only consult the first few TS packets to check for the presence of the broadcast metadata such as the private PID and hint data or the extended TS Header Adaptation Field EBP marker. For a raw elementary stream (i.e. raw AAC audio-only) based HLS Segment, the hint data can be stored inside the ID3 container that wraps the elementary stream content.

The approach described above still requires the non-HLS packager 180 to consult the content on disk to generate the target format manifest. Nevertheless, the consolidation of EBP markers into a single piece of hint data along with the location of the hint data at the beginning of the HLS Segment 140a-c, 150a-c, 160a-c provides a more efficient manifest generation mechanism than the alternative of searching through all of the content for EBP markers.

Furthermore, and as was mentioned above, various decoder-specific configuration information, such as SPS, PPS, and ADTS information may be added to the HLS manifest 130. The decoder-specific configuration information may be added as vendor-specific tags (e.g. #EXT-X-CISCO-SPS; #EXT-X-CISCO-ADTS; #EXT-X-H264-SPS; #EXT-X-H264-PPS; and #EXT-X-AAC-ADTS), typically using Base64 encoding (in that SPS, PPS, and ADTS are binary data and Base64 is convenient encoding for expressing binary data as ASCII text). The encoder specific information is typically small (i.e. a few tens of bytes), and so does not add noticeably to the size of the manifest.

Adding the decoder configuration information to the HLS playlist also aids the non-HLS manifest generation process by allowing the non-HLS packager 180 to get necessary data from the HLS playlist, instead of by content examination.

It is appreciated that the terms "playlist" and "manifest" are used interchangeably in the ABR realm. Typically, the term "playlist" is used in discussing HLS, while the term "manifest" is used in discussions about HSS, DASH, and HDS. Accordingly, the two terms "playlist" and "manifest", in all of their various forms, are understood in the present specification and claims to be referring to the same thing, unless otherwise explicitly noted.

The following discussion now focuses on the general aspects of the adaptation of the HLS Common Interface Format manifest to one of the other, non-HLS formats performed by the non-HLS packager 180. It is appreciated that each ABR format has a unique manifest format. The method for converting from the HLS manifest is unique for each format.

For converting HLS to HSS, the manifest is produced by extracting quality levels and timestamps from HLS playlists and extracting all other information from the beginning of each segment of each bitrate in the HLS playlists. It is appreciated that the ODE process still needs to consult every segment, but rather than searching through the entire segment, the indexing information is located at the beginning of the segment. The HSS fragments themselves are directly translated from the HLS segments by building up video frames for video fragments and audio access units for audio fragments.

For converting HLS to HDS, the manifest is produced by extracting media information from the HLS playlists. The HDS fragments are directly translated from HLS segments by building up video frames and audio access units, in the same way as HSS.

For converting HLS to MPEG DASH, the media presentation description (MPD), describing segment information (e.g. timing, segment URL, media characteristics, such as video resolution and bitrates) is produced by extracting Adaptation Set information from the HLS playlists as well as from the beginning of each segment of each bitrate in the HLS playlists. Each MPEG DASH segment is translated directly from an HLS segment.

Figure 2:
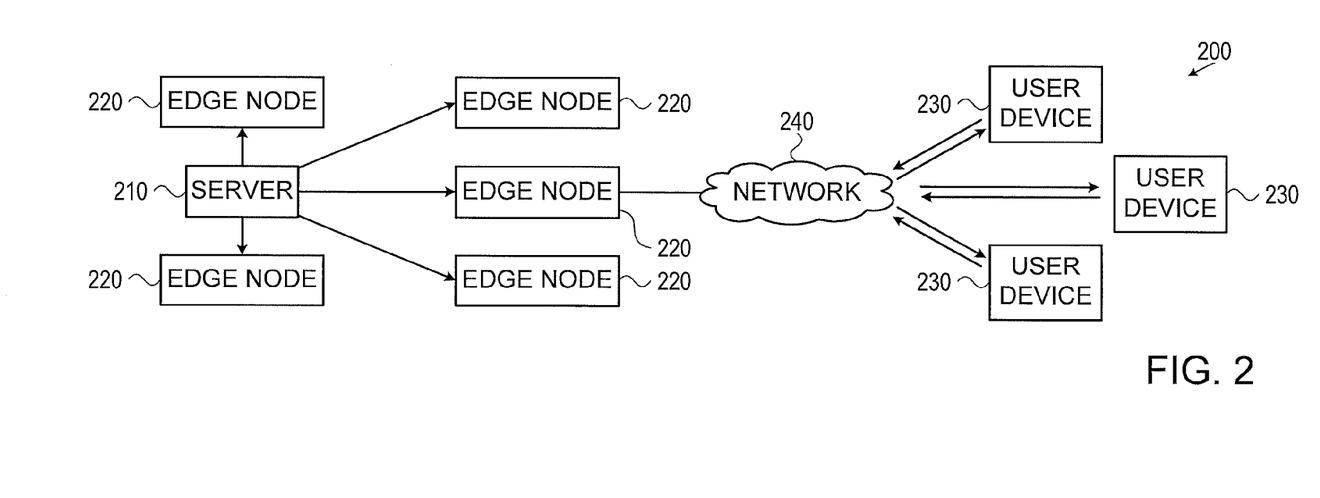
FIG. 2 is a block diagram drawing of a content distribution network (CDN) in which the system of FIG. 1 may be implemented.

Reference is now made to FIG. 2, which is a block diagram drawing of a content distribution network (CDN) 200 in which the system of FIG. 1 may be implemented. As those skilled in the art will appreciate, the CDN 200 is typically a large distributed system of servers deployed in multiple data centers across the Internet. The CDN's 200 purpose is to serve content to end-users with high availability and high performance. It is also appreciated that the present invention may be implemented in other situations where content is available for adaptive bitrate (ABR) downloading and streaming. The CDN 200 is brought here as one example of such an embodiment. Other non-limiting examples of such embodiments might include: a video "headend" where video processing and delivery occurs centrally, rather than being distributed to the edge of a CDN; multicast distribution over a variety of transports including cellular access networks; and an in-home network, where segments could also be transformed from HLS to target format and then distributed over WiFi.

The CDN 200 typically comprises at least one server 210 on which large numbers of content items may be stored and served to end users, upon demand. Typically, intermediate servers located close to end-users in the network are in communication with the server 210, and are referred to as "edge node" servers, edge nodes, or edge servers 220. Edge nodes 220 communicate with user devices 230, typically over a network 240.

The method and system in which an HLS playlist is adapted to one of a number of non-HLS formats may be implemented in any of the servers (i.e. the server 210 or one of the edge nodes 220) of the content distribution network 220. Typically, the method and system will be implemented in one of the edge nodes 220, as the edge nodes 220 are close to the user devices 230. Placing the conversion on the edge node maximizes bandwidth and cache savings. CIF is transmitted once to the edge. If CIF is used further up in the CDN, then quadruple the bandwidth and caching is required downstream (i.e. one copy of each file to be streamed must be stored in each of the four varieties of file formats: HLS, HDS, HSS, and DASH). However, there is no reason why the method and system may not be implemented in a different server. Alternatively, the method and system of the present invention may also be implemented at a home gateway or a client device. For ease of discussion and depiction, all further references will be to the edge node 220. Nonetheless, it is understood that the edge node 220 is brought by way of example, and not meant to be limiting.

Figure 3:
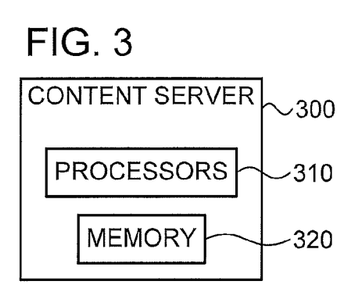
FIG. 3 is a block diagram drawing of a content server for use in the system of FIG. 1.

Reference is now made to FIG. 3, which is a block diagram drawing of a content server 300 for use in the system of FIG. 1. The content server 300 may comprise the one of the edge nodes 220 or the server 210 of FIG. 2. Alternatively, the content server 300 may be any other device operative to serve as an adaptive bitrate content server in order to stream the content to one of the user devices 230 (FIG. 2).

The content server 300 comprises at least one processor 310, and may comprise more than one processor 310. One of the processors 310 may be a special purpose processor operative to perform the adaptation of HLS playlists to one of HSS, HDS and MPEG DASH formats, according to the method described herein. In addition, the content server 300 comprises non-transitory computer-readable storage media (i.e. memory) 320. The memory 320 may store instructions, which at least one of the processors 310 may execute, in order to perform the method of adaptation of HLS playlists to one of HSS, HDS and MPEG DASH formats, described herein. Content server 300 also comprises typical and standard hardware and software components as are known in the art.

Figure 4:
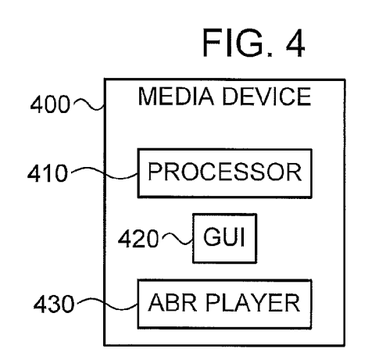
FIG. 4 is a block diagram drawing of a client media device for use in the system of FIG. 1.

Reference is now made to FIG. 4, which is a block diagram drawing of a client media device 400 for use in the system of FIG. 1. The client media device 400 may comprise one of the user devices 230 of FIG. 2. Typical implementations of the client media device 400 include, but are not limited to a tablet device, smartphone, desktop or portable computer, set-top box, Internet-enabled television, media center PC, or any other suitable device, such as is known in the art.

The media device 400 comprises at least one processor 410, a user interface (typically a graphical user interface, GUI) 420, and an ABR player 430. The GUI 420 and the ABR player 430 may comprise a single application, may be two applications which interact with each other, or the GUI may be part of a different application, such as a Web browser. As will be discussed below, with reference to FIG. 5, the GUI 420 enables a user of the media device 400 to interact with the ABR player 430, request content, start, stop, and pause the ABR player 430, and perform other well-known typical user interactions with the ABR player 430.

Processor 410 may comprise more than one processor 410. One of the processors 410 may be a special purpose processor operative to perform the adaptation of HLS playlists to one of HSS, HDS and MPEG DASH formats, according to the method described herein. In addition, the client media device 400 comprises non-transitory computer-readable storage media (i.e. memory—not depicted). The memory may store instructions, which at least one of the processors 410 may execute, in order to perform the method of adaptation of HLS playlists to one of HSS, HDS and MPEG DASH formats, described herein (i.e. that is to say that the adaptation method described herein may, in principle, be performed at either the content server 300 of the media device 400). Client media device 400 also comprises typical and standard hardware and software components as are known in the art.

Figure 5:
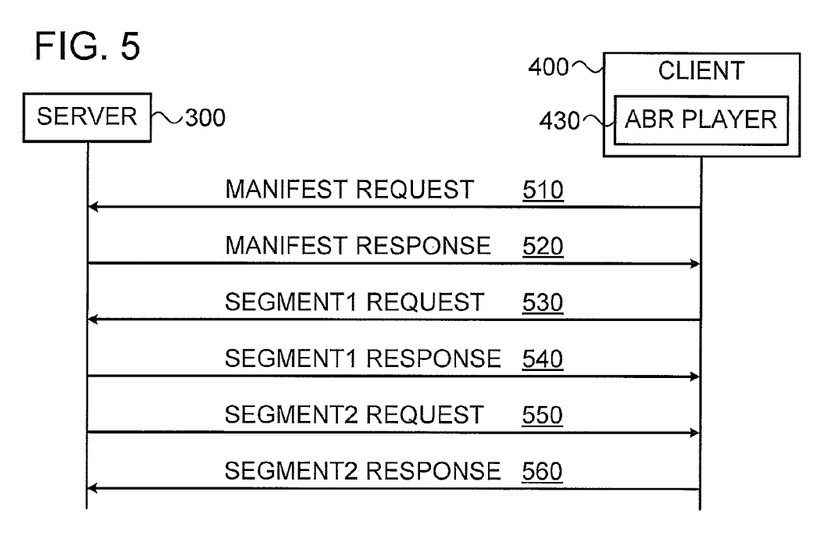
FIG. 5 is a data flow diagram depicting typical communication between the content server of FIG. 3 and the client media device of FIG. 4.

Reference is now additionally made to FIG. 5, which is a data flow diagram depicting typical communication between the content server 300 of FIG. 3 and the client media device 400 of FIG. 4. In a first stage of operation, the user typically actuates the ABR player 430 via the GUI 420 and selects an audio or audio-visual content item for viewing/listening to. The ABR player 430 sends a request to receive a manifest (step 510) of content item segments comprising the audio or audio-visual content item selected by the user from the content server 300.

The ABR player 430 receives the requested manifest from the content server 300 (step 520). The manifest will be in one of the formats mentioned above: HLS, HDS, HSS, or MPEG DASH. The format of the manifest received by the ABR player 430 will match the format of the request sent to the content server 300 in step 510. Upon receipt of the manifest request, the server 300 accesses a stored manifest for the requested content item. Since the content server 300 stores the requested manifest in HLS format, if the request of step 510 is received in HLS format, the content server 300 will serve reply by sending the requested manifest in HLS format. However, if the request of step 510 is received in a non-HLS format (IDS, HSS, or MPEG DASH), the content server 300 will adapt the stored HLS format manifest to a manifest in the appropriate non-HLS format, as described below.

Figure 6:
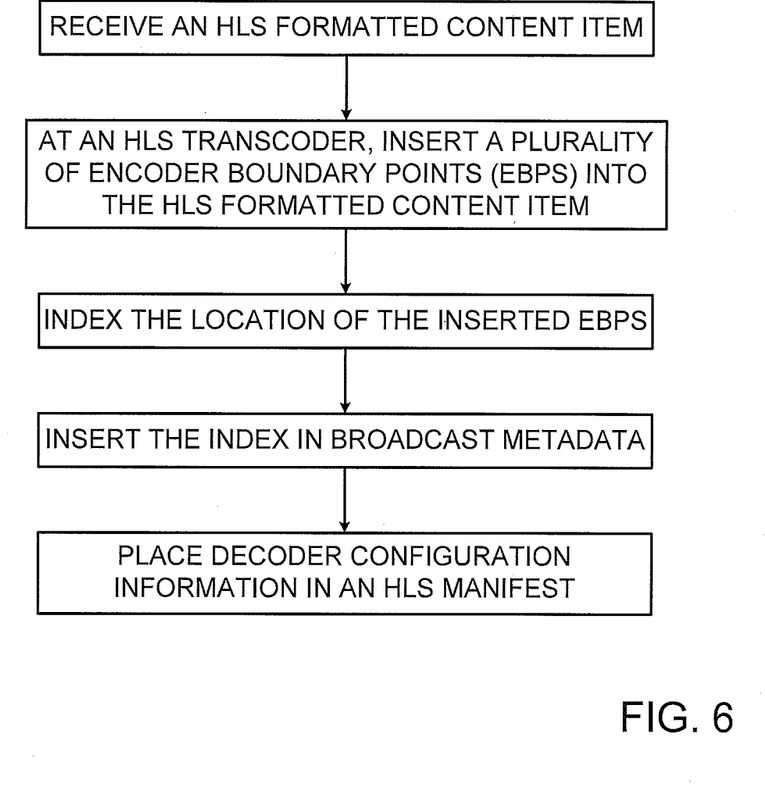
FIG. 6 is a simplified flow chart of a method of operation of the system of FIG. 1.

Reference is now made to FIG. 6, which is a simplified flow chart of a method of operation of the system of FIG. 1. The method of FIG. 6 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for preparing content for streaming, the method comprising:
receiving an HLS formatted content item;
inserting, by an HLS transcoder, a plurality of encoder boundary points (EBPs) into the HLS formatted content item, the EBPs comprising segment boundary markers which indicate segmentation of the received HLS formatted content item for non-HLS formats;
placing hints about locations of the inserted EBPs at the start of broadcast metadata of HLS segments in the HLS formatted content item, the broadcast metadata being one of: a private PID; or an extended TS Header Adaptation Field EBP marker, wherein the hints comprise any of the following:
byte offsets of the inserted EBPs; and
timestamps of the inserted EBPs; and
inputting the HLS formatted content item into an on-demand encapsulation process.

2. The method of claim 1 and further comprising placing decoder configuration information in an HLS manifest associated with the HLS formatted content item.

3. The method according to claim 2 wherein the decoder configuration information comprises at least one of:
AVC SPS (H.264 Advanced Video Coding Sequence Parameter Set) information;
PPS (H.264 Advanced Video Coding Picture Parameter Set) information; and
AAC ADTS (H.264 Advanced Audio Coding Audio Data Transport Stream) information.

4. The method according to claim 1 wherein an output of the on-demand encapsulation process is prepared for non-HLS streaming.

5. The method according to claim 1 wherein the receiving occurs at the HLS transcoder.

6. The method according to claim 1 and further comprising using the hints about the location of the EBPs to prepare non-HLS format content.

7. The method according to claim 1 wherein the EBPs are inserted at multiple time intervals, enabling segmentation of the content item into segments of multiple time intervals.

8. The method according to claim 1 wherein the HLS formatted content item comprises an MPEG-2 Transport Stream (TS) content item.

9. The method according to claim 1 wherein the HLS formatted content, item comprises a raw Elementary Stream.

10. The method according to claim 1 wherein the HLS formatted content item comprises at least one of: subtitle data; caption data; and WebVTT data.

11. The method according to claim 1 wherein the broadcast metadata comprises the following data about I-frames located in the HLS formatted content item:
byte offset;
a size of the I-frame in bytes a transport stream file, including the transport stream overhead; and
timestamp.

12. The method according to claim 11 wherein the data about the I-frames are used for producing a trick play manifest.

13. The method according to claim 12 wherein a packager unit builds a non-HLS format manifest at least in part by determining the location of the EBPs and I-frames as a result of consulting the data in the broadcast metadata.

14. The method according to claim 1 wherein decoder-specific information is added to a manifest for the HLS formatted content item.

15. The method according to claim 14 wherein a packager unit determines non-HLS format decoder-specific information based on the decoder-specific information added to the manifest for the HLS formatted content item.

16. The method according to claim 1 wherein an output of the HLS transcoder always comprises at least one EBP.

17. A system for preparing content for streaming, the system comprising:
an HLS formatted content item into which an HLS transcoder inserts a plurality of encoder boundary points (EBPs), the EBPs comprising segment boundary markers which indicate segmentation of the received HLS formatted content item for non-HLS formats;
a processor which places hints about locations of the inserted EBPs at the start of broadcast metadata HLS segments in the HLS formatted content item, the broadcast metadata being one of: a private PID; or an extended TS Header Adaptation Field FBP marker, wherein the hints comprise any of the following:
byte offsets of the inserted EBPs; and
timestamps of the inserted EBPs; and
an inputter which inputs the HLS formatted content item into an on-demand encapsulation process.

18. A system for preparing content for streaming, the system comprising:
means for receiving an HLS formatted content item;
means for inserting, by an HLS transcoder, a plurality of encoder boundary points (EBPs) into the HLS formatted content item, the EBPs comprising segment boundary markers which indicate segmentation of the received HLS formatted content item for non-HLS formats;
means for placing hints about the location of the inserted EBPs at the start of broadcast metadata of HLS segments in the HLS formatted content item, the broadcast metadata being one of: a private PID; or an extended TS Header Adaptation Field EBP marker, wherein the hints comprise any of the following:
byte offsets of the inserted EBPs; and
timestamps of the inserted EBPs; and
means for inputting the HLS formatted content item into an on-demand encapsulation process.

* * * * *

UNITED STATES PATENT AND TRADEMARK OFFICE
CERTIFICATE OF CORRECTION

| | | |
|---|---|---|
| PATENT NO. | : 9,888,047 B2 | Page 1 of 1 |
| APPLICATION NO. | : 14/244174 | |
| DATED | : February 6, 2018 | |
| INVENTOR(S) | : Eric Friedrich et al. | |

It is certified that error appears in the above-identified patent and that said Letters Patent is hereby corrected as shown below:

On the Title Page

Item (72), Column 1, Line 1, address of the first inventor, "Sommerville," to read as -- Somerville, --.

In the Specification

Column 8, Line 37, "IDS" to read as -- HDS --.

In the Claims

Column 9, Line 46, in Claim 9, "content," to read as -- content --.

Column 9, Line 54, in Claim 11, "bytes a" to read as -- bytes in a --.

Column 10, Line 25, in Claim 17, "metadata HLS" to read as -- metadata of HLS --.

Column 10, Line 28, in Claim 17, "FBP" to read as -- EBP --.

Signed and Sealed this
Third Day of April, 2018

Andrei Iancu
*Director of the United States Patent and Trademark Office*